(12) United States Patent
Dax et al.

(10) Patent No.: US 8,776,855 B2
(45) Date of Patent: Jul. 15, 2014

(54) APPARATUS FOR PROCESSING FLAT ARTICLES, IN PARTICULAR PRINTED PRODUCTS

(75) Inventors: Roman Dax, Hinwil (CH); Thomas Luginbuhl, Hinwil (CH)

(73) Assignee: Ferag AG, Hinwil (CH)

( * ) Notice: Subject to any disclaimer, the term of this patent is extended or adjusted under 35 U.S.C. 154(b) by 1147 days.

(21) Appl. No.: 12/679,763

(22) PCT Filed: Sep. 16, 2008

(86) PCT No.: PCT/CH2008/000387
§ 371 (c)(1),
(2), (4) Date: Mar. 24, 2010

(87) PCT Pub. No.: WO2009/039673
PCT Pub. Date: Apr. 2, 2009

(65) Prior Publication Data
US 2010/0199600 A1    Aug. 12, 2010

(30) Foreign Application Priority Data
Sep. 25, 2007 (CH) ....................... 1492/07

(51) Int. Cl.
| | | |
|---|---|---|
| B32B 37/00 | (2006.01) | |
| B29C 65/00 | (2006.01) | |
| B65B 25/14 | (2006.01) | |
| B65B 51/16 | (2006.01) | |
| B65B 51/30 | (2006.01) | |

(52) U.S. Cl.
CPC ........... *B29C 66/83511* (2013.01); *B65B 25/14* (2013.01); *B65B 51/16* (2013.01); *B65B 51/30* (2013.01)
USPC ................ 156/543; 156/553; 156/581

(58) Field of Classification Search
USPC ......... 156/543, 538, 539, 553, 580, 581, 582, 156/583.1; 53/203
See application file for complete search history.

(56) References Cited

U.S. PATENT DOCUMENTS

| 5,337,542 A | 8/1994 | Omori | |
|---|---|---|---|
| 2002/0079199 A1* | 6/2002 | Wipf et al. | 198/803.3 |
| 2005/0022481 A1* | 2/2005 | Ballestrazzi et al. | 53/553 |
| 2006/0042759 A1* | 3/2006 | Honegger | 156/553 |
| 2007/0209323 A1* | 9/2007 | Honegger | 53/371.4 |

FOREIGN PATENT DOCUMENTS

| EP | 0 308 861 | 3/1989 |
|---|---|---|
| EP | 0 855 341 | 7/1998 |
| EP | 1 810 922 | 7/2007 |

* cited by examiner

*Primary Examiner* — James Sells
(74) *Attorney, Agent, or Firm* — Rankin, Hill & Clark LLP

(57) ABSTRACT

A device for processing flat objects (40) delivered successively in a delivery direction, in particular print shop products, and/to a continuously advanced material web (42). The device, which is to be used particularly for welding a material web, includes at least one rigid body (90) that can be pivoted about an axis of rotation (D) and at least one tool (10) having a processing-effective zone (12), the tool being attached to the body (90) and movable along an orbit (U) by rotating the body (90). The tool is attached to the body (90) pivotally or rotatably about a pivot axis (S). The pivot position of the tool can be adjusted as a function of the rotational position of the rigid body by means of a stationary control gate and a control element interacting with the control gate and connected to the tool.

17 Claims, 4 Drawing Sheets

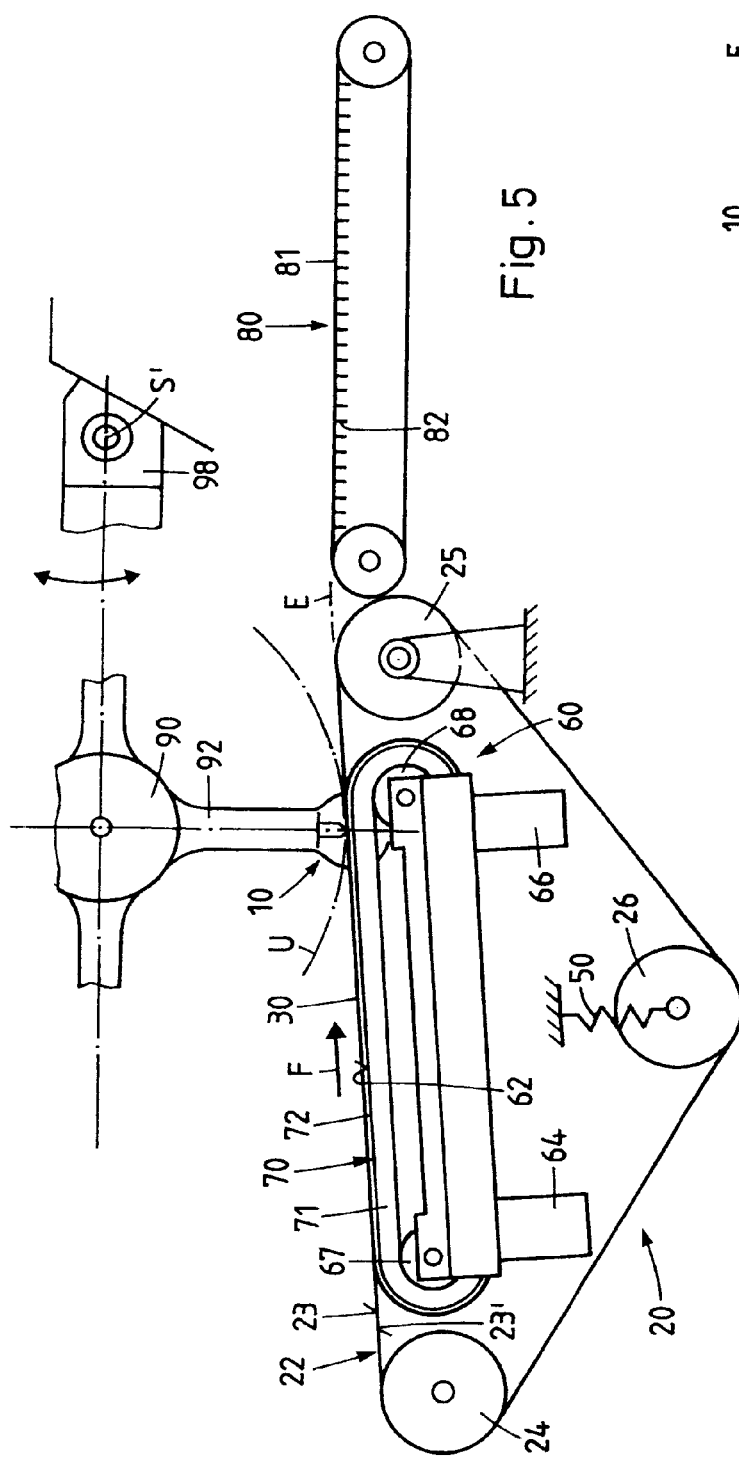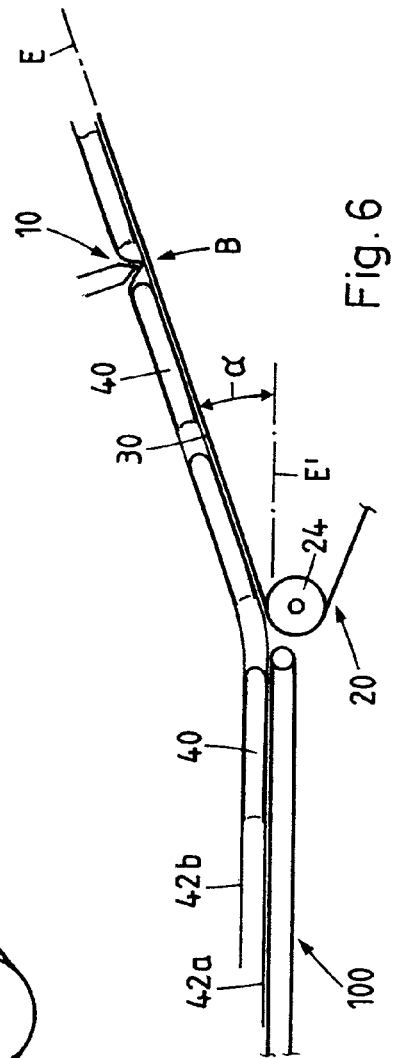

APPARATUS FOR PROCESSING FLAT ARTICLES, IN PARTICULAR PRINTED PRODUCTS

BACKGROUND OF THE INVENTION

1. Field of the Invention

The invention concerns the field of conveying and packaging technology and relates to an apparatus for processing continuously conveyed flat products, in particular printed products, and/or a continuously moving, quasi endless material web, in particular a sheet-material web.

2. Description of Related Art

Processing products in a conveying stream requires, on the one hand, high processing speeds and a straightforward, low-wear design for the mechanical components which means that the latter are not particularly susceptible to malfunctioning and, on the other hand, precise control of the movement of the tools and of the products and a processing time which is as long as possible. Most processes used for processing products or a material web, e.g. welding, cutting or printing, also require a certain counterpressure or resistance to be applied by a counterpart tool which interacts with the actual tool. Some of these requirements are met in different ways.

Movement of the tools along a circular path is mechanically straightforward to achieve and is usually preferred. Such apparatuses with welding tools which are moved along circular paths by virtue of a rigid body being rotated are known, for example, from EP-A 1 362 790, WO 00/35757 or WO-A 2005/118402. While the tools in EP-A 1 362 790 or WO-A 2005/118402 are always oriented in the radial direction, the orientation of the tools in WO 00/35757 is kept constant in that the tools are fastened in a rotatable manner on the rotary body and, as the latter rotates, circulate synchronously in the opposite direction.

In the case of the apparatus according to WO 00/35757, the position of the processing zone of the tool, that is to say of that part which interacts with the product or the material web, depends greatly, on account of the distance from the pivot axis, on the quality of synchronization of the counterrotation of the tool with the rotary movement of the rotary body. If guide tracks are used for this purpose, these guide tracks have to be formed very precisely.

The apparatuses according to EP-A 1 362 790 and WO 00/35757 comprise counterpart tools which move synchronously with the actual tool and likewise circulate on a circular path. In order to extend the processing duration, and thus the processing region, the movement paths of the tool and counterpart tool, these paths being circular in the non-loaded state, intersect. Since the tools are mounted resiliently relative to the rotary body, the circulatory path of the tool is flattened by the counterpressure applied by the other tool respectively and the processing region is thus extended. The forces which act on the tools here, however, may lead to wear.

International patent application PCT/CH2007/000130, which was not published before the priority date, proposes, as an alternative to the purely circular path, to connect the tool to the carrying arm in a pivotable manner via a lever arm such that the processing zone is at a distance from the pivot axis and thus, depending on the pivoting position, is at a variable distance from the center of rotation. The pivoting position is adjusted by a control element which interacts with a control track and is located in the region of the processing zone and, thus, likewise at a distance from the pivot axis. In this way, it is possible to produce a circulatory path for the processing zone which differs from a purely circular path, and in particular has a rectilinear segment for extending the processing region. A second control element and a second control track also make it possible to adjust the orientation in space. In the case of this apparatus, the precise position of the processing zone and the orientation and speed thereof during passage through the processing region depend greatly on the accuracy of the control track. The control track, thus, has to predetermine the movement path of the control elements within relatively narrow limits, e.g. if the orientation is to be kept constant. This may give rise to problems when, for example, products of different thicknesses are processed. Moreover, the forces which prevail during processing have to be absorbed via the control elements and control tracks. Undesired torques arise here.

An apparatus for welding a material web without a circulating counterpart tool is known from WO-A 2005/118402. The apparatus comprises a plurality of welding tools which are arranged on a wheel, are always oriented in a radial direction and thus, once again, describe a circular path. Located beneath the wheel is a conveying belt by means of which a material web and also products which are to be wrapped by the material web are conveyed into the processing region of the welding tools. The conveying belt acts as a counterpart tool and itself applies the resistance which is necessary for processing. Although each individual point on the conveying belt is moving, the conveying belt as a whole does not change its position relative to the welding tool, and this does away with any synchronization problems.

In the case of the welding apparatus according to WO-A 2005/118402, the purely circular circulatory path of the tools and of the processing zones thereof, in this case the hot welding zone (welding bars) of welding tools, is arranged such that it undercuts the conveying plane defined by the top side of the non-loaded conveying belt. For this purpose, the conveying belt, which is guided around two stationary rollers, is multilayered and can be compressed perpendicularly to the belt plane. Directed toward the tool is a firm, friction-reducing carrying layer which is a good thermal insulator and is, for example, Teflon-coated, and this is followed by a damping layer, e.g. made of compressible foam, and a base material. The carrying layer is, thus, deflected downward to a slight extent by the pressure of the tool, and the damping layer is compressed. This damping layer can compensate for small undercuts of the conveying plane by the tools in the order of magnitude of a few millimeters. It is not possible, however, to control the orientation of the welding tools in the case of the apparatus according to WO-A 2005/118402.

It is, thus, an object of the invention to reduce the above-described problems of the prior art and to ensure, in particular, precise controllable positioning of the processing zone of the tools in the processing region.

The apparatus according to the invention serves for processing flat articles, in particular printed products, conveyed one after the other in a conveying direction and/or for processing a continuously conveyed material web. A preferred use is that of welding a sheet-material web for packaging products. Other uses are possible, e.g. printing, cutting, application of adhesive, supplying supplementary products.

The apparatus comprises at least one rigid body, which can be rotated about an axis of rotation, e.g. a wheel or a carrying arm, and at least one tool, which is fastened on this body, can be moved along a circulatory path by virtue of the body being rotated and has a processing zone. This tool is, in particular, a welding tool with a welding bar as the processing zone. The tool is fastened on the body such that it can be rotated or pivoted about a pivot axis, wherein the pivoting position of the tool can be adjusted, in dependence on the rotary position of the rigid body, by means of a fixed-location control track (control cam) and a control element which interacts with the control track and is connected to the tool. According to the invention, the pivot axis is at a constant distance from the axis of rotation, and the processing zone of the tool is arranged in the immediate vicinity of the pivot axis, wherein the control element is spaced apart from the processing zone. This design has the advantage that the position of the processing zone in space is known precisely at any point in time because the processing zone is always located on a circular path of which the radius corresponds to the distance of the pivot axis from the center of rotation.

However, the orientation of the processing zone can be adjusted precisely with the aid of the control element and of the control track. Since the control element is spaced apart from the pivot axis, a change in its position does not result in any change, or in only a very slight change, in orientation of the processing zone without a simultaneous change in position relative to the product which is to be processed. In order to achieve a desired level of accuracy, less outlay is thus required for the purposes of configuring and positioning the control track than has been the case hitherto.

Since the processing zone is mounted directly on the rigid body, e.g. on the carrying arm, rather than on a circumferentially projecting lever arm, the force which can be applied during processing is led off in the radial direction. The force is, thus, absorbed directly by the rigid body via the center of rotation thereof. There is no torque arising which has to be absorbed and compensated for. This likewise contributes to an increase in the processing quality and to the stability of the apparatus.

The control track is preferably designed such that the orientation of the tool in space is essentially constant at least in a sub-region of the circulatory path, in particular in, and upstream and downstream of, the processing region. This has advantages, in particular, for welding since the welding bar can be inserted between two products, and come into contact with the material web, vertically.

The apparatus can be used with a moving counterpart tool which is fitted, for example, on a complementary counterpart apparatus. This is advantageous, in particular, in cutting tools which require a counterpart blade.

In a preferred development of the invention, however, the counterpressure which is necessary for processing is applied by the conveying belt of a conveying arrangement without any separate counterpart tool being present. The conveying belt, for this purpose, has mechanical properties adapted to the processing, e.g. strength, heat resistance, low friction.

For this purpose, the apparatus comprises a conveying arrangement for conveying the articles or material web. The conveying arrangement has at least one carrier belt, which is driven in circulation, and deflecting means for deflecting the same. A conveying support for the products or the material web is formed by an outer surface of the carrier belt, this outer surface being directed toward the at least one tool. This conveying support interacts in the processing region, as a counterpart tool, directly or indirectly, i.e. via the product or the material web, with the tool in that it sets against the tool a certain resistance or processing pressure which is necessary for processing purposes.

The advantage of such an apparatus is that only a small amount of space is required and there is no need for synchronization with a counterpart tool. Moreover, the product is fully supported by the carrier belt at any point in time. This allows precise conveying and processing even at high processing speeds.

A hitherto unsolved problem in respect of a counterpart tool which is fixed in location overall, e.g. a conveying belt, is constituted by relatively large degrees of deflection of the conveying belt caused directly or indirectly by the tools, e.g. when the latter, on account of inaccurate supply, strike against a product rather than coming between the products. In the case of a stiff conveying belt, this may result in the tools jamming or being damaged. An elastic conveying belt can compensate for this in some cases, but does not appear, in normal circumstances, to meet the requirements relating to precise feeding of the products (no sagging).

For the purpose of solving this problem, in an advantageous development of the invention, at least one of the deflecting means for the carrier belt is mounted resiliently. Depending on how the resilient mounting is configured, the following advantages may be achieved: if those deflecting means between which the conveying support is defined are resilient, they can change their position in space and, thus, move out of the way of the tool, e.g. when the latter applies pressure to a product instead of alongside the same. If the deflecting means which define the conveying support are fixed, but a further deflecting means is resilient, the resilient mounting can compensate for deflection of the carrier belt. In both cases, the carrier belt itself may thus be comparatively stiff and firm. This makes it possible, using straightforward means, to realize a conveying support which, even under loading, is well-defined, largely planar and does not sag. The further deflecting means prestresses the carrier belt preferably in the outward direction in order, despite the stiffness of the carrier belt, to achieve a planar, non-sagging conveying support.

In a development of the invention, the conveying function of the conveying arrangement is separate from the supporting function by virtue of an additional supporting means being arranged beneath the conveying support, at least in the processing region. This supporting means has a supporting surface which runs parallel to the outer surface of the carrier belt, is directly adjacent to the inner surface of the carrier belt and stabilizes the carrier belt. A largely planar conveying surface is, thus, provided irrespective of the elastic properties of the carrier belt. The carrier belt itself may thus, if appropriate, also be elastic.

As an alternative, or in addition, it is particularly preferred if the supporting means is mounted resiliently, preferably that the supporting surface can be tilted in, and transversely to, the conveying direction. The supporting surface is preferably prestressed in the outward direction toward the carrier belt. The resilient mounting is configured such that the supporting surface remains planar even when tilted. As a result, the conveying support can move out of the way of any disruption, but remains planar in the process.

For the purpose of extending the processing region in the, in this case, circular circulatory path of the processing zone, it is advantageous that the circulatory path of the tool undercuts the conveying plane and the carrier belt or the supporting means has a compressible damping layer for absorbing the deflection of the carrier belt, of usually 10-15 millimeters, which occurs during normal processing.

In particular, when a damping layer is present, the resilient mounting of the conveying support and/or of the supporting means serves, in particular, to compensate for disruption which results in the conveying support being deflected to an extent which is greater than that customary for normal processing.

The apparatus according to the invention is preferably used for welding a material web, e.g. within a sheet-wrapping production line. The tools are welding tools with a welding bar as the processing zone. The carrier belt of a conveying arrangement in the form of a belt conveyor acts as the counterpart tool. Products positioned on a sheet-material web are wrapped by the sheet-material web, and the resulting sheet-material enclosure is then welded transversely to the conveying direction by the welding tools and severed by material displacement during welding, this resulting in two spaced-apart weld seams being formed. Such a processing apparatus will be explained in more detail hereinbelow with reference to the figures.

The products are preferably supplied to the abovementioned conveying arrangement by a belt conveyor. There are advantages if the conveying plane of the conveying arrangement is positioned obliquely, and runs upward, relative to the conveying plane of the belt conveyor. This is explained in more detail hereinbelow with reference to the drawings.

The presence of a removal arrangement, which is arranged downstream of the actual processing apparatus, as seen in the conveying direction, is also preferred. This removal arrangement can preferably grip the processed products or the processed material web, e.g. can fix the same on its conveying belt by means of suction air. It conveys preferably at a greater conveying speed than the abovementioned conveying arrangement. Since the welding zone can also be deformed plastically immediately following processing, it is possible for the sheet-wrapped products, if not severed optimally, to be severed from one another in this way simply by being pulled apart.

BRIEF DESCRIPTION OF THE DRAWINGS

Examples of the invention are described hereinbelow and illustrated in the drawings, in which, purely schematically:

FIG. 5 shows a side view of a processing apparatus as in FIG. 4, wherein the supporting means comprises a supporting belt which runs along with the carrier belt; and FIG. 6 shows a detail of a conveying arrangement with a conveying plane positioned obliquely relative to that of an upstream conveying arrangement.

DETAILED DESCRIPTION OF THE INVENTION

Figure 1:
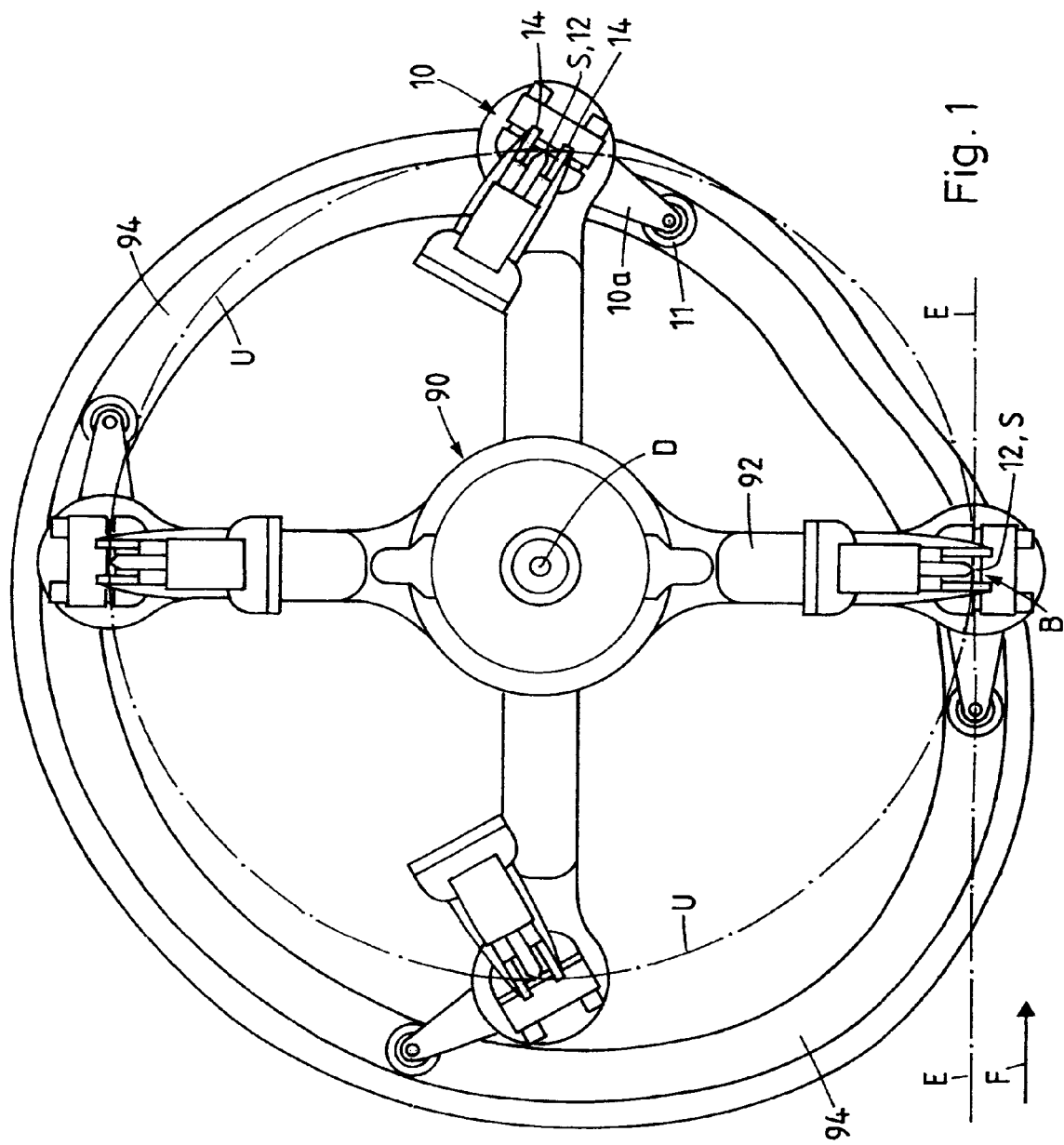
FIG. 1 shows a view of a processing apparatus with four carrying arms and welding tools fitted thereon.

FIG. 1 shows a view of a processing apparatus according to the invention with a rigid body 90 which can be rotated about an axis of rotation D. The body 90 has four carrying arms 92, and a tool 10 is fitted at the distal ends of each of these carrying arms, at a constant distance from the axis of rotation D, such that it can be pivoted about a pivot axis S. The angle between the carrying arms 92 may be constant. It is preferred that the carrying arms can be moved in a controlled manner relative to one another individually or in pairs (e.g. mutually opposite carrying arms 92), in which case it is possible to vary the speed of the carrying arms 92 along the circulatory path U.

The tools 10 serve for processing products or a material web conveyed past the processing apparatus in a conveying plane E, along a conveying direction F.

Figure 2:
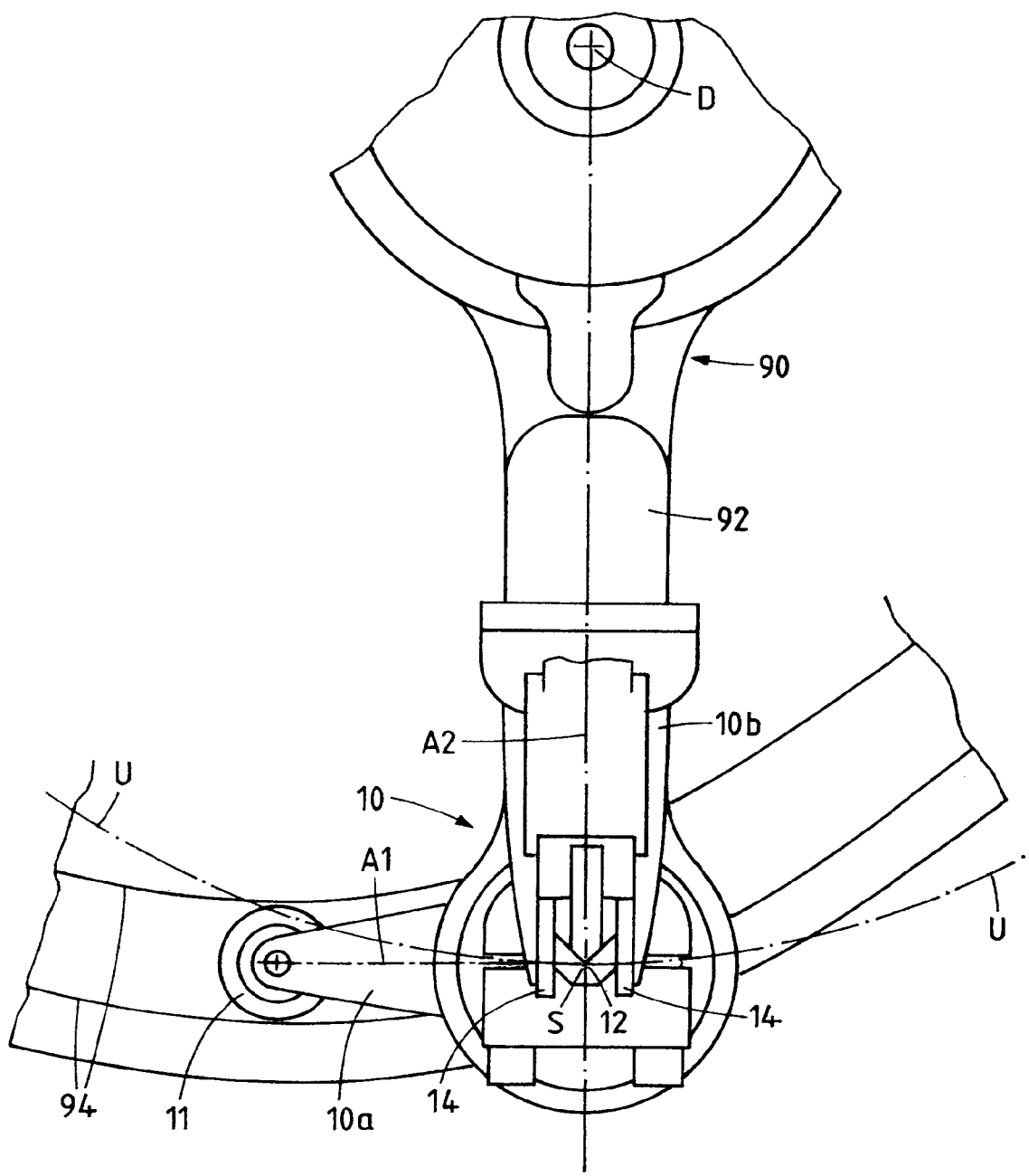
FIG. 2 shows a partial view of a processing apparatus for the purpose of illustrating the welding tool and the control element, which is connected thereto, for adjusting the pivoting position.

The tools 10 are illustrated in detail in FIG. 2. These tools are welding tools with a processing zone 12 in the form of a welding bar and two resilient holding-down means 14 arranged to the sides of the welding bar, as described, for example, in WO-A 2005/118402. The tools 10 comprise two arms 10a, 10b, of which the axes A1, A2 enclose a fixed angle of approximately 90°. The pivot axis S is located at the point of intersection of the two axes A1, A2. One of the arms 10b carries the actual welding tool with a welding bar as the processing zone 12. The holding-down means 14 run parallel to the axis A2 of the arm 10b. The processing zone 12 is located on the pivot axis S. A control element 11 in the form of a control roller is arranged in a rotatable manner at that end of the further arm 10a which is directed away from the pivot axis S. This control roller rolls on a guide track 94 during rotation of the body 90. Depending on the way in which the guide track 94 is formed, the angle between the connection D-S and the axis A2, and thus the pivoting position of the tool, changes. Since the processing zone is located on the pivot axis S, rather than its distance from the axis of rotation D changing, only its orientation relative to the carrying arm 92 changes. The welding bars 12, thus, describe a circular circulatory path U. In the processing region B, the circulatory path U undercuts the conveying plane E slightly. As a result of the pivoting capability of the tools 10, the holding-down means 14, in, and upstream and downstream of, the processing region B, are oriented vertically or in some other predetermined orientation in relation to the product or the material web. Since the processing zone 12 is arranged on the pivot axis S, the orientation can be adjusted without the movement path U of the processing zone 12 deviating from a circular path. Very precise control of the movement and orientation of the welding tool 10 is thus possible. This makes it possible for the apparatus to be used, in particular, at high processing speeds and with high forces.

The welding bars 12 preferably taper to a point in section, and this further increases the welding precision. Hot material is displaced laterally, and this results in two separate weld seams.

The apparatus which is shown in FIG. 1 is preferably used together with a belt conveyor which conveys the products into the processing region B and also serves as a counterpart tool for the processing operation. In order to achieve processing which is as precise as possible, it should be the case that the conveying belt, on the one hand, always remains in the conveying plane, i.e. does not sag, but, on the other hand, has a certain degree of compliance under unusually high loading, in order for jamming of the tools to be prevented.

Figure 3:
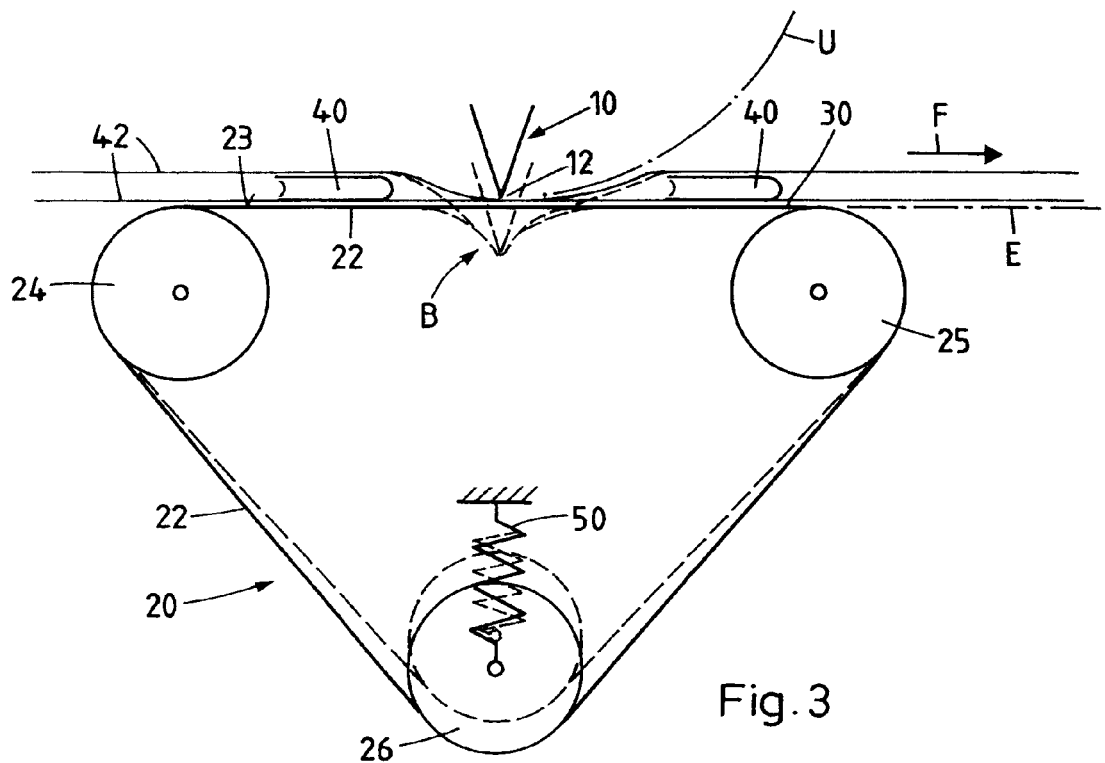
FIG. 3 shows a side view of a processing apparatus with a conveying arrangement with a carrier belt deflected over in this case three deflecting rollers, wherein one of the deflecting rollers is mounted resiliently, in the normal state (solid lines) and in the state of abnormal loading (dashed lines)
Figure 4:
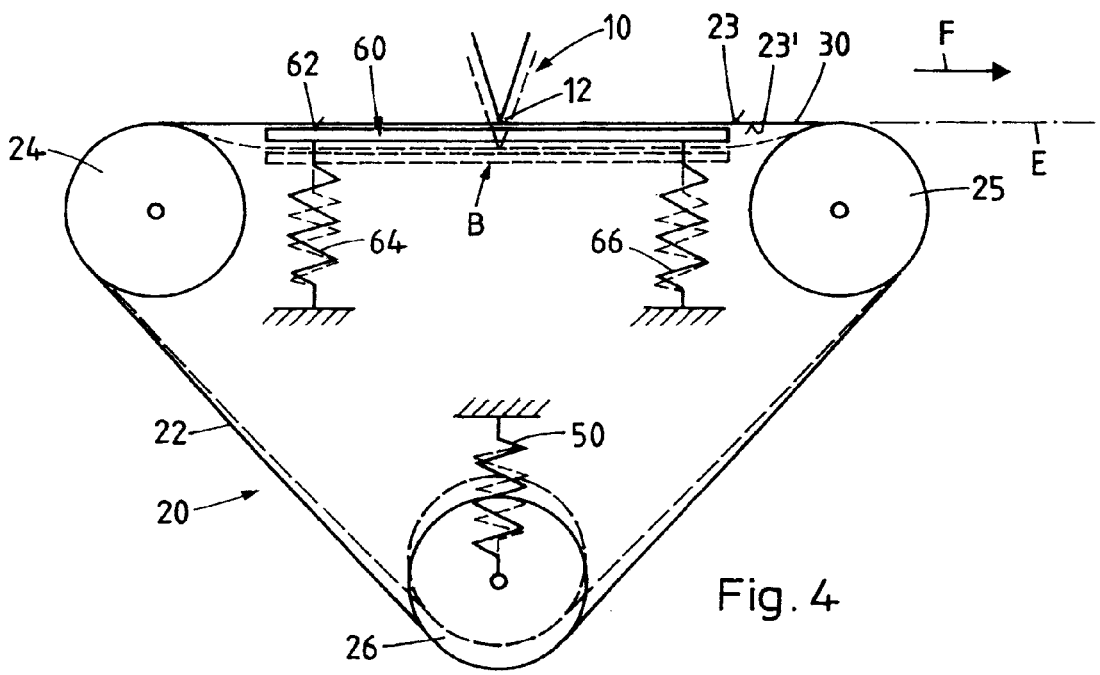
FIG. 4 shows a side view of a processing apparatus as in FIG. 3, with a resiliently mounted supporting means, arranged beneath the conveying support, in the normal state (solid lines) and in the state of abnormal loading (dashed lines)

FIGS. 3 and 4 illustrate two variants of a conveying arrangement 20 which meets these requirements. The figures each show a side view in the normal state (solid lines) and in the state of abnormal loading (dashed lines).

The conveying arrangement 20 is a belt conveyor with a carrier belt 22, which is deflected via, in this case, three deflecting rollers 24, 25, 26. The conveying arrangement 20 conveys products 40 and/or a material web 42 in a conveying direction F. The deflecting rollers 24, 25, 26 tension the carrier belt 22 such that its outer side 23 in the non-loaded or normally loaded state, in the region which is directed toward the tool 10, forms a largely planar conveying support 30 for the products 40 and/or the material web 42. The conveying support 30 defines a conveying plane E which runs tangentially to the circulatory path U of the tools 10 or can be undercut slightly by this circulatory path. That region in which the tool 10 can act on the products 40 or the material web 42 is referred to as processing region B. The undercutting of the conveying plane E extends the processing region B. The carrier belt 22 optionally has a damping layer, for example as described in WO-A 2005/118402.

The carrier belt 22 preferably comprises a heat-resistant, friction-reducing layer which is a good thermal insulator, in particular one made of Teflon or a Teflon-containing material. The elasticity of the carrier belt is low, in order to realize a conveying support 30 which, even under loading, is as planar as possible.

In FIGS. 3 and 4, one of the deflecting rollers, to be precise the bottom deflecting roller 26, which does not serve for defining the conveying plane 30, is mounted resiliently. The resilient-mounting means 50 of this deflecting roller 26 serves for compensating for relatively significant deflection of the conveying support 30 and for prestressing the carrier belt 22 in the outward direction. Relatively minor deflection can be compensated for, for example, just by the abovementioned damping layer.

Such "relatively significant" loading is illustrated in a highly exaggerated form in FIGS. 3 and 4. This has been compensated for in the prior art by virtue of the carrier belt 22 being extended elastically. In the present case, the resilient-mounting means 50 of the deflecting roller 26 results in the deflecting roller 26 moving counter to the spring force, and thus in the deflection being compensated for without any significant changes in length of the carrier belt 22. The latter can therefore be configured to be stiffer and more stable than has been the case hitherto.

The resilient-mounting means 50 prestresses the bottom deflecting roller 26 in the outward direction, in which case the carrier belt 22 is always taut and, particularly in the processing region B, does not sag.

The apparatus according to FIG. 4, in addition to the components described above, has a supporting means 60 beneath the conveying support 30, in the processing region B. The supporting means 60 has a planar supporting surface 62 which runs parallel to the outer surface 23 or conveying support 30 of the carrier belt 22 and is directly adjacent to the inner surface 23' of the carrier belt 22. This supporting surface may be fixed in location or else circulate around rollers, as is shown in FIG. 5. The supporting means 60 absorbs the weight of the products 40 and the processing pressure. The supporting surface 62 here extends over a large surface area, preferably over the entire width of the carrier belt and preferably also over most of the length of the conveying support 30 as measured between the two rollers 24, 25.

The supporting surface 62 is mounted resiliently via resilient-mounting means 64, 66, to be precise preferably such that it can tilt as a whole in the conveying direction F and/or transversely thereto. The resilient-mounting means 64, 66 may likewise serve to prestress the carrier belt 22 in the outward direction. Since the supporting surface 62 has a large surface area, the conveying support 30 is not subjected to punctiform deformation under loading; rather, the entire supporting surface 62 is pushed downward. Depending on the elasticity of the carrier belt 22, the resilient-mounting means 50 of the bottom deflecting roller 26 can additionally compensate for deflection; if appropriate, however, it is also possible to dispense with this resilient-mounting means 50. The conveying support 30 always remains largely planar at least in the processing region. This has advantages, in particular, at high processing speeds.

The supporting surface 62 may have a damping layer which compensates for minor deflection, e.g. that caused by the normal processing pressure. The resilient-mounting means 64, 66 intervene only in the event of relatively major disruption.

FIG. 5 shows a processing apparatus which is based on the principle from FIG. 4. In contrast to FIG. 4, the supporting means 60 is provided with a continuous supporting belt 70 which runs along with the carrier belt 22. This supporting belt is tensioned between two deflecting rollers 67, 68. Its top strand 71 forms the supporting surface 62, which is located directly beneath the conveying support 30.

The supporting means 60 absorbs largely all the forces which are caused by the weight of products 40 resting on the carrier belt 22 and by the processing by the tool. The tool 10 here describes a circular circulatory path U which undercuts the conveying plane E slightly. In order to compensate for the associated deflection of the carrier belt 22 which occurs during normal operation, the supporting belt 70 has a compressible damping layer 72. Since it rests on the damping layer, which applies a certain amount of counterpressure, the carrier belt 22 is subjected only to punctiform deformation around the tool, and the conveying support 30 remains otherwise flat.

It is possible for the supporting belt 70 to consist entirely of damping material, e.g. foam, or to be constructed from layers with only one having damping properties. Since it is moved along with a friction fit by way of the carrier belt 22, wear due to friction on the carrier belt 22 is greatly reduced.

In relation to the variant with a carrier belt which has an integrated damping layer, this variant, with a carrier belt and damping layer which are separate from one another, has the advantage that the mechanical properties of the carrier belt and damping material can be selected independently of one another and the corresponding components can be interchanged independently of one another.

The supporting means 60 is mounted resiliently by, in the present case, four shock absorbers 64, 66, only two of which are visible in the side view. This makes it possible to compensate for deflection which the damping layer is no longer able to absorb. The supporting surface 62 can tilt in, and transversely to, the conveying direction F. As a result of the resiliently mounted supporting surface 62, the conveying support 30 is supported over a large surface area and thus, even under relatively high loading, is largely smooth and planar.

In a preferred embodiment of the invention, the processing apparatus serves for producing a weld seam in a packaging material, in particular for wrapping products entirely in this material. The tool 10 is a welding tool, in particular as described in WO-A 2005/118402, by means of which weld seams are produced in the material web. So that there is no need for an additional severing cut, the wrapped products 40 are severed as the packaging material is welded. A belt conveyor 80 is provided, this being arranged downstream of the conveying arrangement 20, as seen in the conveying direction F, and conveying at a somewhat greater speed than this conveying arrangement. Its conveying belt 81 is connected to a vacuum source via suction openings 82, in which case the wrapped products 40 are attached by suction and are reliably detached from the products/material enclosure on account of the greater speed and being secured by a vacuum. This severing method can also advantageously be used in other welding apparatuses.

A further advantageous feature of the apparatus which is shown in FIG. 5 is the ability of the rotatable body 90, which is mounted on a retaining arm 98, to pivot about an axis S'. The retaining arm 98 is mounted such that it can be pivoted on a carrying framework and, in the event of operation of the apparatus ceasing for a relatively long period of time, it can be pivoted away upward. The pivotable body 90 has the advantage that the position of the movement path U of the processing zones 12 of the tool 10 can be adapted to changing requirements, e.g. different degrees of undercutting of the conveying plane E or different thicknesses of the material web 42. This method of giving the body 90 pivoting capability can also advantageously be used in other processing apparatuses.

The conveying arrangement 20 is likewise mounted such that it can be pivoted and adjusted about the axis of the roller 25.

FIG. 6 shows a further advantageous supplement to the apparatus according to the invention, in particular for use of the latter for packaging products 40 with a packaging-material web 42. The products here usually rest on a first material-web part 42a and are covered from above by a further material-web part 42b; these parts may be a sheet-material web which is folded over to form an enclosure or two separate webs. For the purpose of welding such material webs, the top web 42b has to be moved in relation to the bottom web 42a, which rests on the conveying belt, in order for the two webs 42a, 42b to be welded. In order for this to be possible, the top web 42b needs to be longer.

For this purpose, the conveying plane E of the conveying arrangement 20 here is inclined (such that it ascends in the conveying direction) by an angle α of 2-15°, in particular 5-10°, in relation to the conveying plane E' of an upstream feed conveyor 100. This gives the top material-web part 42b some amount of play in the processing region B, and processing can take place without the web being overstretched. This feature can also advantageously be used in other processing apparatuses, for example those with differently mounted tools.

The invention claimed is:

1. An apparatus for processing flat articles, in particular printed products, conveyed one after the other in a conveying direction (F) and/or for processing a continuously conveyed material web, in particular for welding a material web, the apparatus comprising:
    at least one rigid body, which can be rotated about an axis of rotation (D), and
    at least one tool, which is fastened on said rigid body, and can be moved along a circulatory path (U) by virtue of the body being rotated and has a processing zone,
    wherein the tool is fastened on the rigid body such that said tool can be rotated or pivoted relative to said rigid body about a pivot axis (S),
    wherein the pivoting position of the tool can be adjusted, in dependence on the rotary position of the rigid body, by means of a fixed-location control track and a control element that interacts with the control track and is connected to the tool,
    wherein the pivot axis (S) is at a constant distance from the axis of rotation (D),
    wherein the processing zone of the tool is arranged in the immediate vicinity of the pivot axis (S), and
    wherein the control element is spaced apart from the processing zone.

2. The apparatus as claimed in claim 1, wherein it is possible to change the pivoting position of the tool relative to the rigid body by the control track such that an orientation of the tool in space is essentially constant at least in a sub-region of the circulatory path (U).

3. The apparatus as claimed in claim 1, wherein the control element is coupled rigidly to the processing zone of the tool via a lever arm.

4. The apparatus as claimed in claim 1, further comprising a conveying arrangement for conveying the articles and/or material web, wherein the conveying arrangement has at least one carrier belt, which is driven in circulation, and wherein a conveying support is formed by an outer surface of the carrier belt, said outer surface being directed toward the at least one tool, and for processing purposes, in a processing region (B), is capable of interacting at least indirectly with the tool.

5. The apparatus as claimed in claim 4, wherein the carrier belt has a temperature-resistant coating.

6. The apparatus as claimed in claim 4, wherein the conveying support has arranged beneath it a supporting member that has a supporting surface that runs parallel to the outer surface of the carrier belt and is directly adjacent to an inner surface of the carrier belt.

7. The apparatus as claimed in claim 6, wherein the supporting member comprises at least one circular continuous supporting belt that circulates over further deflecting members, wherein the supporting surface is formed by the top strand of this supporting belt.

8. The apparatus as claimed in claim 7, wherein the supporting belt comprises a damping layer.

9. The apparatus as claimed in claim 6, wherein the supporting member is mounted resiliently, such that the supporting surface can be tilted in, and transversely to, the conveying direction (F).

10. The apparatus as claimed in claim 4, wherein the circulatory path (U) intersects a conveying plane (E) which, in the non-loaded state, is defined by the conveying support.

11. The apparatus as claimed in claim 4, further comprising a further conveying arrangement, which is arranged upstream of the conveying arrangement, as seen in the conveying direction, wherein the conveying support of the conveying arrangement is arranged at an angle of 2-30° in relation to a conveying plane (E') of the further conveying arrangement.

12. The apparatus as claimed in claim 4, further comprising a removal arrangement that is arranged downstream of the conveying arrangement, as seen in the conveying direction, and that conveys the processed products or the processed material web at a greater conveying speed than the conveying arrangement and fixes the same preferably by means of suction air.

13. The apparatus as claimed in claim 4, further comprising deflecting members for deflecting the carrier belt.

14. The apparatus as claimed in claim 13, wherein the deflecting members are deflecting rollers.

15. The apparatus as claimed in claim 13, wherein at least one of the deflecting members for the carrier belt is mounted resiliently.

16. The apparatus as claimed in claim 13, wherein the carrier belt is guided over at least three deflecting members, wherein two of the deflecting members are mounted at a fixed location and the carrier belt is tensioned between the same, in which case the conveying support, in the non-loaded state, is essentially planar, and wherein a further deflecting member is mounted resiliently.

17. The apparatus as claimed in claim 16, wherein the resilient mounting of the resiliently mounted deflecting member is selected such that the latter is capable of compensating for deflection of the carrier belt caused by forces applied by the tool, and that compensation for deflection of the carrier results in the overall length of the carrier not changing significantly.

* * * * *